(12) United States Patent
Heimburger et al.

(10) Patent No.: US 7,482,080 B2
(45) Date of Patent: Jan. 27, 2009

(54) FUEL CELL SYSTEM WITH A COOLING DEVICE

(75) Inventors: Stefan Heimburger, Willstaett-Legelshurst (DE); Thomas Heid, Renchen-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/195,244

(22) Filed: Aug. 2, 2005

(65) Prior Publication Data

US 2006/0029843 A1 Feb. 9, 2006

(30) Foreign Application Priority Data

Aug. 5, 2004 (DE) ............ 10 2004 037 901

(51) Int. Cl.
*H01M 8/04* (2006.01)
(52) U.S. Cl. .................. 429/22; 429/13; 429/26
(58) Field of Classification Search .......... None
See application file for complete search history.

(56) References Cited

U.S. PATENT DOCUMENTS

| 6,087,028 | A  | * | 7/2000  | Goto ............... 429/24 |
| 6,777,121 | B1 | * | 8/2004  | Shimanuki et al. ...... 429/23 |
| 2002/0184901 | A1 | * | 12/2002 | Ishikawa .......... 62/171 |

FOREIGN PATENT DOCUMENTS

DE    195 17 813    11/1996
DE    198 25 286    12/1998

* cited by examiner

*Primary Examiner*—John S Maples
(74) *Attorney, Agent, or Firm*—Michael J. Striker

(57) ABSTRACT

A fuel cell system has a fuel cell unit for generating electric current and/or thermal heat, a cooling device provided for cooling the fuel cell unit and having at least one first flow generator for generating a flow of a first cooling fluid, in particular a liquid coolant, and a second flow generator for generating a flow of a second cooling fluid, in particular a cooling air, in which a more-efficient temperature regulation is realized, compared to the prior art, with a control unit provided for comparison of a first operating parameter, or a change in the first operating parameter, of the first flow generator with a second operating parameter, or a change in the second operating parameter, of the second flow generator.

10 Claims, 4 Drawing Sheets

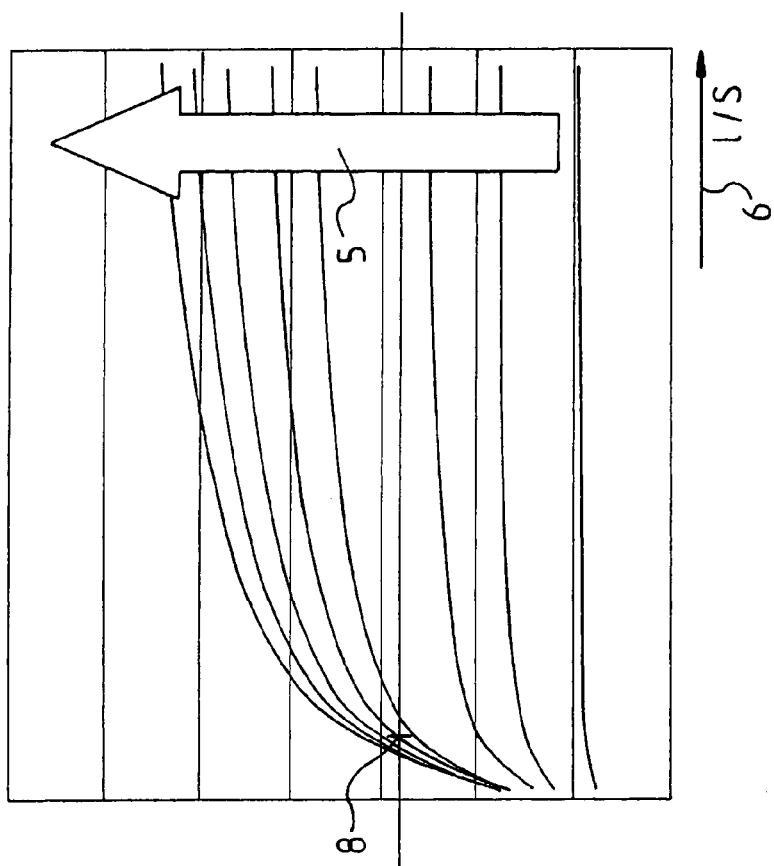
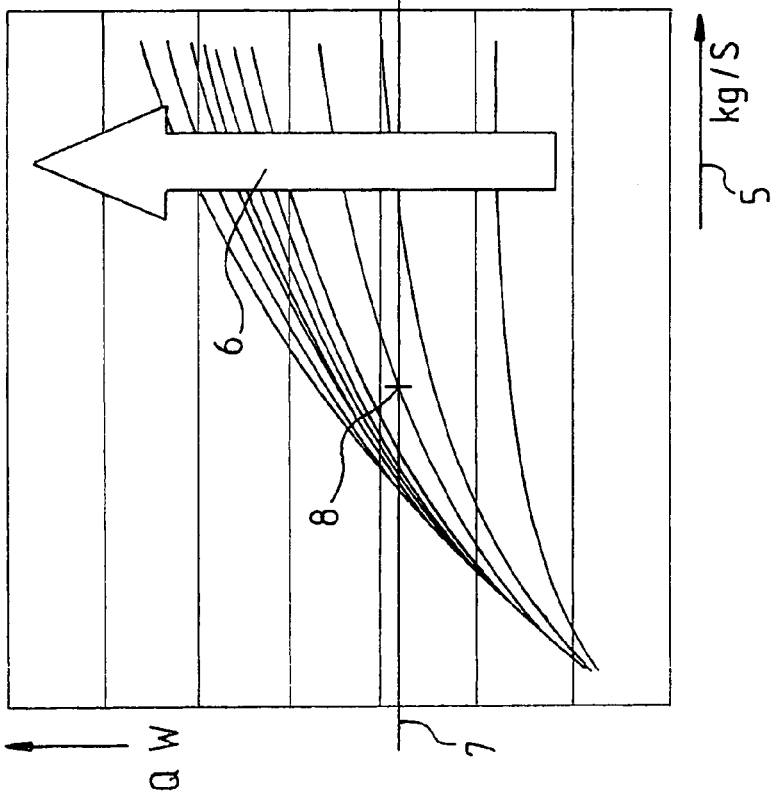

FUEL CELL SYSTEM WITH A COOLING DEVICE

CROSS-REFERENCE

The invention described and claimed hereinbelow is also described in DE 10 2004 037901.7, filed Aug. 5, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a fuel cell system with a cooling device.

Fuel cells are planned to be used increasingly in both stationary and mobile applications. In mobile or vehicle applications, fuel cells can be used as a vehicle drive mechanism or as a so-called auxiliary power unit (APU).

In the operation of the fuel cells or the fuel cell stack, besides electrical energy, thermal energy is generated as well. The thermal energy is often dissipated as waste heat with the aid of cooling or a coolant loop. The waste heat is sometimes used for heating applications.

The cooling of the fuel cell or fuel cell stack includes a coolant loop, for instance, which is driven by means of a pump. The coolant loop further includes a heat exchanger, which in turn has air blown at it with the aid of a blower or fan, so that heat is dissipated to the ambient air.

From German Patent Disclosure DE 195 17 813, a method for regulating the heat-guided operation of fuel cell systems is known that regulates the forward-flow or return-flow temperature of the coolant or effective-heat loop by means of an adaptation to the heat demand of the consumer. The forward-flow or return-flow temperature of the coolant or effective-heat loop is regulated such that a temperature that is as close as possible to just below the allowable maximum value is set. As a result, a continuous adaptation of the heat production by the fuel cell to the current heat demand is achieved.

From German Patent DE 198 25 286 C2, a fuel cell system with a coolant loop as sketched above is known, in which the temperature distribution in the fuel cell is detected, by way of measuring the forward-flow or return-flow temperature of the coolant and the resultant difference, or by means of measuring the internal temperature. The coolant throughput through the fuel cell is controlled in agreement with the parameters, reflecting the temperature distribution inside the fuel cell, using a preset value corresponding to a nonuniform temperature.

SUMMARY OF THE INVENTION

It is therefore an object of the invention to propose a fuel cell system with a fuel cell unit for generating electric current and/or thermal heat and with a cooling device for cooling the fuel cell unit, in which the cooling device has at least one first flow generator and one second flow generator; a more energy-efficient temperature regulation is achieved, compared to the prior art.

In keeping with these objects and with others which will become apparent hereinafter, one feature of the present invention resides, briefly stated, in a fuel cell system, comprising a fuel cell unit for generating electric current and/or thermal heat; a cooling device for cooling said fuel cell unit, said cooling device having at least one first flow generator for generating a flow of a first cooling fluid, and a second flow generator for generating a flow of a second cooling fluid; and a control unit for comparison of a first parameter selected from the group consisting of a first operating parameter and a change in the first operating parameter of said first flow generator, with a second parameter selected from the group consisting of a second operating parameter and a change in the second operating parameter of said second flow generator.

Accordingly, a fuel cell system of the invention is distinguished by the fact that a control unit is embodied at least for a comparison of a first operating parameter, or a change in the first operating parameter, of the first flow generator with a second operating parameter, or a change in the second operating parameter, of the second flow generator.

With the aid of such an advantageous comparison of the operating parameters or the change in the operating parameters of the two flow generators, it becomes possible for the first time, with the aid of the invention, to select the flow generator that is operating more efficiently, preferably as a function of the operating state or the change in the operating state, or that carries the waste heat out of the coolant loop of the fuel cell unit more efficiently than the other flow generator. As a result, whichever flow generator is the most efficient regulates the temperature of the fuel cell unit with the aid of the advantageous control unit. As a result, especially the overall efficiency of the system is increased decisively over the prior art.

In the prior art defined by German Patent DE 198 25 286 C2, the flow speed of the liquid coolant is raised and lowered as a function of the internal temperature of the fuel cell. If the internal temperature of the fuel cell unit exceeds a defined limit temperature, then the cooling blower is switched on in addition, causing the internal temperature of the fuel cell to drop again.

In contrast to this, however, the invention makes use of the recognition that the cooling of the fuel cell unit in different operating states can be done most efficiently by means of the first flow generator, in particular the liquid coolant pump or the like, or in other operating states by the second flow generator, and in particular by the cooling blower or the like. Optionally, it is possible to increase the cooling by increasing the power levels or the like of both flow generators.

Efficiency of the mode of operation in the sense of the invention is understood above all to mean the mode of operation in which the achievable cooling is attained with the least possible energy consumption of the flow generator or generators, or in other words particularly with comparatively little electrical power consumption of the flow generator or generators.

With the aid of the control unit of the invention and the parameter comparison by the control unit, it can be attained that the heat quantity to be carried away from the fuel cell unit is realized by the most efficient flow generator and/or by the combined efficient mode of operation of both flow generators. This is associated with the least possible energy consumption of the flow generator or generators. With this operating strategy, the so-called parasitic loads on the fuel cell system can be reduced and thus the efficiency of the entire system can be increased.

Advantageously, the operating parameters of the flow generators are embodied as a power and/or an rpm and/or a cooling fluid flow. Depending on the particular operating state of the fuel cell unit and of the two flow generators and as a function of a change in the operating state of the fuel cell unit, it is advantageously possible to make the comparison according to the invention with the aid of the current electrical power levels, such as consumer power, flow generator power, rotary speeds, and/or the changes or differential changes in these operating parameters. These parameters are in part already detected in known fuel cell systems, and the corresponding changes in the operating parameters are easily ascertained or calculated, so that the expenditure for the comparison according to the invention is only very slight.

In a special refinement of the invention, the control unit is embodied for changing at least the power and/or the rpm and/or the cooling fluid flow of the first flow generator and/or the power and/or the rpm and/or the cooling fluid flow of the second flow generator as a function of the parameter comparison. The advantageous temperature regulation of the fuel cell unit is thus realized in an elegant way.

Preferably, the control unit is embodied for checking the first and/or second operating parameters of the two flow generators as a function of at least one parameter or of a change in the parameter of the fuel cell unit. For instance, the parameter or the change in the parameter of the fuel cell unit is a load or an electrical power output and/or a heat loss. Corresponding parameters of the fuel cell unit are in part already detected in conventional fuel cell systems, so that recourse can be had to means that are already present, making the effort and expense of realizing the invention relatively slight.

In an advantageous variant of the invention, the control unit is embodied for comparing at least two temperatures of the fuel cell unit and/or of the cooling device. For instance, the two temperatures may be an inlet and/or an outlet temperature of the fuel cell unit or of one of the cooling fluids, in particular the liquid coolant, and/or of a fuel of the fuel cell unit. With this provision, in particular the maximum allowable temperature difference from the cooling fluid inlet to the cooling fluid outlet can be assured or regulated. The maximum allowable temperature difference depends above all on the type of fuel cell unit used, and in currently known fuel cell units is approximately 5 to 10K.

Optionally, at least two temperature sensors are used for detecting the two temperatures. Preferably, the control unit is embodied for forming the temperature comparison as a function of the parameter of the fuel cell unit and/or of a volumetric flow of the cooling device. By this advantageous provision, the temperature comparison can be done with only a single temperature sensor. The second temperature or the corresponding temperature difference can be calculated in accordance with the advantageous provision, for instance with the aid of the parameter of the fuel cell unit and of the volumetric flow of the cooling device, and so forth, be mathematically calculated or stored in memory advantageously in a memory unit or the like. The one temperature sensor thus dispensed with means a reduction in both the engineering and the commercial expenditure for realizing the invention.

Advantageously, the control unit is embodied for changing at least the power and/or the rpm and/or the fluid flow of the first flow generator and/or the power and/or the rpm and/or the fluid flow of the second flow generator as a function of the temperature comparison. This assures that an adaptation of the heat loss can advantageously be realized as a function of the temperature comparison or the temperature difference of the two temperatures.

In general, the change in the aforementioned operating parameters of the flow generators can be done as a function of the parameter comparison of the invention. It is advantageous that even the changes performed as a result of the temperature comparison are made efficiently. This makes it possible for the entire temperature regulation of the fuel cell system of the invention to be embodied efficiently.

It is conceivable for instance for two largely separate fluid loops, each with one flow generator, to be provided. Advantageously, the cooling device has at least one heat exchanger unit for temperature exchange between the two cooling fluids. With this provision, a coupling of the two cooling systems is made possible. Advantageously, the first cooling fluid is embodied as cooling liquid, in particular as liquid coolant, and the second cooling fluid is embodied as cooling gas, in particular as cooling air. With suitably embodied cooling fluids and/or their coupling, recourse can be had to components already conventional on the market, which particularly reduces the commercial expenditure for realizing the invention.

In an advantageous embodiment of the invention, the control unit includes at least one performance graph, stored in memory, of the heat exchanger unit. For instance, the performance graph is stored in an electric memory unit. The performance graph of the heat exchanger unit is preferably embodied at least as a function of the two operating parameters of the flow generators and/or of the heat flow. With a suitable performance graph, the parameter comparison according to the invention can be performed especially elegantly. Above all, a differential change in the heat flow and/or the cooling fluid flows can thus be made available especially simply for the parameter comparison.

It is furthermore advantageous for further performance graphs and characteristic curves of individual components, and relationships between various operating parameters of the fuel cell system, to be stored in memory in the control unit. For example, the heat balance of the fuel cell unit and/or the characteristic system curve of the liquid coolant side and/or the characteristic system curve of the cooling air side, as well as the characteristic curves of the two flow generators or the like, can be stored in suitably advantageous electronic memory units.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows two schematic heat exchanger performance graphs according to the invention;

DESCRIPTION OF THE PREFERRED EMBODIMENTS

Figure 1:
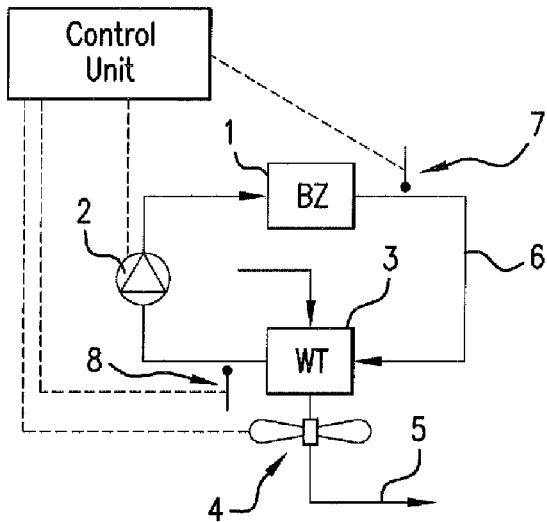
FIG. 1 schematically shows a coolant loop of a fuel cell system according to the invention.
Figure 2:
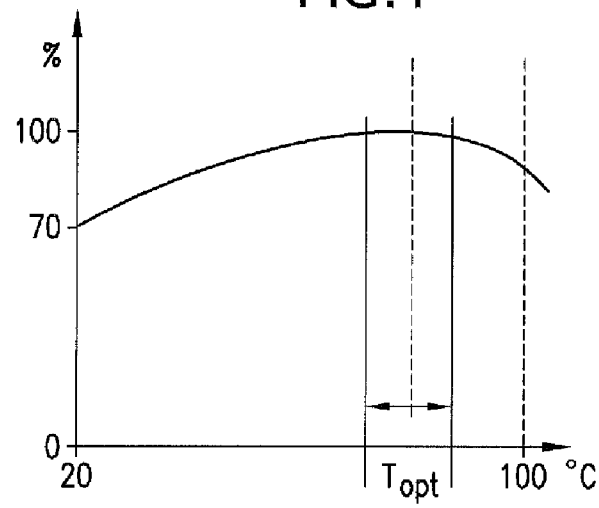
FIG. 2 schematically shows a dependency of a cell voltage on an outlet temperature of an oxidant of a fuel cell unit according to the invention.

In FIG. 1, a coolant loop of a fuel cell system is shown schematically. A fuel cell 1 is cooled with the aid of the coolant loop in such a way that the fuel cell can be operated as much as possible in an optimal temperature range $T_{opt}$ in accordance with FIG. 2. In FIG. 2, a cell voltage of the fuel cell 1 is shown as a percentage of the maximum operating voltage at rated load, over an outlet temperature of an oxidant in degrees Celsius. The temperature range $T_{opt}$ is dependent on the particular fuel cell or fuel cell type used.

The coolant loop of FIG. 1 further includes a pump 2, which recirculates liquid coolant, for instance, in the coolant loop, so that the coolant loop circulates between the fuel cell 1 and a heat exchanger 3. The heat exchanger 3 is cooled by means of a fan 4, which generates an air flow 5. By means of the air flow 5, a liquid coolant flow 6 is cooled, which in turn cools the fuel cell 1.

A temperature sensor 7 is provided downstream of the fuel cell 1 in terms of the flow direction of the liquid coolant flow 6, and a temperature sensor 8 is provided downstream of the heat exchanger 3; these sensors each measure the respective liquid coolant temperature.

In FIG. 4, two heat exchanger performance graphs are shown schematically; a heat flow Q in watts is shown on one side plotted over a cooling air flow rate 5 in kilograms/seconds (FIG. 4a) and on the other side plotted over a volumetric coolant flow 6 in liters/hour (FIG. 4b). The various characteristic curves in FIG. 4a are based on a change or increase in the volumetric coolant flow 6, and the various characteristic curves in FIG. 4b are based on a change or increase in the cooling air flow rate 5.

FIGS. 4a and 4b are joined together by a horizontal line 7. The line 7 stands for a defined quantity of waste heat $Q_{ab}$ of the fuel cell 1 in a defined operating state.

For the sake of clarity of the parameter comparison according to the invention, let it be assumed that the pump 2 and the fan 4, at corresponding rotary speeds, generate a cooling air flow rate 5 and a volumetric coolant flow 6, respectively, that each correspond to the operating point 8 of FIGS. 4a and 4b. At this operating point 8, the waste heat 7 of the fuel cell 1 is carried away. This means that the operating point 8 defines a defined waste heat 7 at a defined cooling air flow rate 5 and a defined volumetric coolant flow 6.

It is clear from FIG. 4a that at the operating point 8, a characteristic curve, that is, the heat Q, has a comparatively slight slope as a function of the cooling air flow rate 5 at a constant volumetric coolant flow 6. In FIG. 4b, it is clear that at the operating point 8, at a constant cooling air flow rate 5, the corresponding characteristic curve has a comparatively great slope. The two slopes are shown schematically in FIG. 3, in which the waste heat $Q_{ab}$ is shown over the fan power $P_L$ and pump power $P_P$. The fan or pump power $P_L$, $P_P$ is essentially proportional to the corresponding rpm or the corresponding volumetric flow or flow rate 6, 5.

Figure 3:
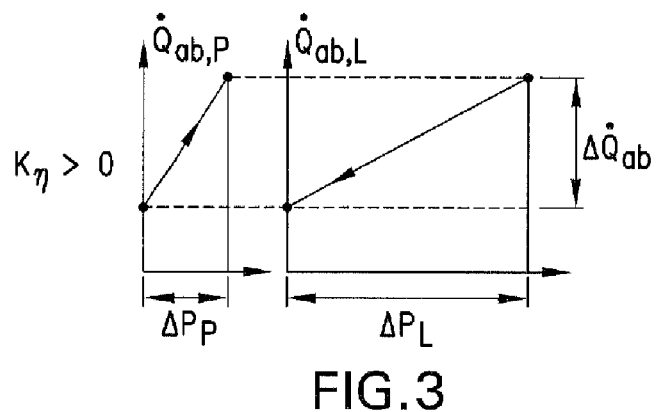
FIG. 3 schematically shows a formation of a power coefficient according to the invention.

FIG. 3 furthermore shows clearly that for a change in waste heat $\Delta Q_{ab}$, either a change in the pump power $\Delta P_P$ or a change in the fan power $\Delta P_L$ at operating point 8 would be necessary. According to the invention, as the parameter comparison according to the invention, a gradient comparison is advantageously performed. For instance, a power coefficient $K_\eta$ is formed by means of an advantageous mathematical difference calculation, in which $$K\eta = \frac{dQ_{ab}}{dP}\bigg|\text{pump} - \frac{dQ_{ab}}{dP}\bigg|\text{fan} = \left(\frac{dQ_{ab,P}}{dVw} * \frac{dVw}{dP_P}\right) - \left(\frac{dQ_{ab,L}}{dm_L} * \frac{dm_L}{dP_L}\right)$$

For forming $K_\eta$, the following data are used:

$$\frac{dQ_{ab,P}}{dVw}$$

. . . differential change in heat dissipation $dQ_{ab,P}$/differential change in volumetric coolant flow $dV_W$ (data source: heat exchanger performance graph)

$$\frac{dVw}{dP_P}$$

. . . differential change in volumetric coolant flow $dV_W$/differential change in pump power $dP_P$ (data source: heat exchanger performance graph)

$$\frac{dQ_{ab,L}}{dm_L}$$

. . . differential change in heat dissipation $dQ_{ab,L}$/differential change in cooling air flow rate $dm_L$ (data source: heat exchanger performance graph)

$$\frac{dm_L}{dP_L}$$

. . . differential change in cooling air flow rate $dm_L$/differential change in fan power $dP_L$ (data source: fan performance graph, characteristic system curve)

The differential heat dissipation values $dQ_{ab,P}$ and $dQ_{ab,L}$ are equal, as FIG. 4 shows. Once $K_\eta$ is ascertained, the regulation is performed.

Since the differential heat dissipation values $dQ_{ab}$ and $dQ_{ab,L}$ are equal, then according to the above definition of $K_\eta$, in the example shown in FIG. 3, $K_\eta>0$. This is in turn means that to achieve a change, caused by a load change $\Delta Q_{ab}$, in the waste heat $Q_{ab}$ of the fuel cell 1, in the example shown in FIG. 3, can be performed most efficiently by increasing the pump power $P_P$. Optionally, the fan power $P_L$ can be reduced, to further increase the efficiency of the temperature regulation.

Figure 5:
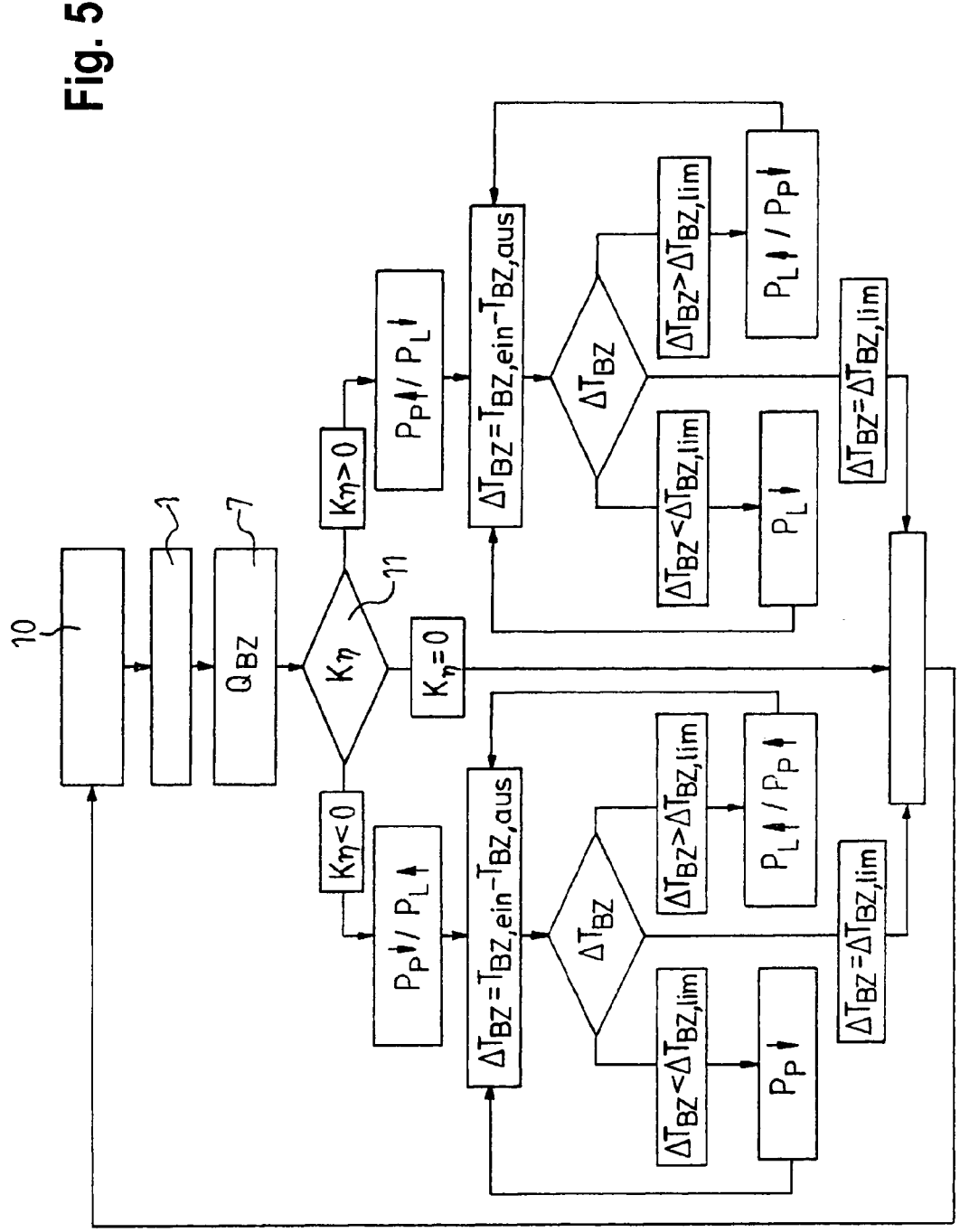
FIG. 5 is a schematic flow chart of a fuel cell system according to the invention.

The regulation of the fuel cell system according to the invention, among other things with the aid of a regulatable pump 2 and a regulatable fan 4, is shown as a flow chart in FIG. 5. The example of FIG. 3 described above pertains to the case where $K_\eta>0$. In FIG. 5, the cases are also shown in which the power coefficient $K_\eta<0$ and $K_\eta=0$.

FIG. 5 shows in particular that at an electrical consumer load 10, the fuel cell 1 generates a heat dissipation 7. A change in the consumer load 10 thus causes a change in the heat dissipation 7. The heat dissipation 7 is preferably known in the form of a heat balance performance graph for the fuel cells 1 used or at the most various loads 10, and these are stored for instance in an electronic memory unit.

According to the invention, the power coefficient $K_\eta$ formed 11; in this variant, in particular the differential change in the volumetric coolant flow 6 or the differential change in the pump power $P_P$ and the differential change in the cooling air flow rate 5 or the differential change in the pump power $P_L$ are compared with one another for forming $K_\eta$. With the aid of the aforementioned gradient formation of $K_\eta$ the cooling system component 2, 4 which, upon a change in the fuel cell waste heat $Q_{ab}$ carries away the heat most efficiently, among other ways via the heat exchanger 3, by means of an increase in media flow, that is, of the coolant 6 or the cooling air 5, is ascertained.

FIG. 5 shows the further essential steps in regulating the cooling system. For further clarification of the regulation, FIG. 6 additionally shows the block circuit diagram of the invention.

The optimal set-point temperature 11 $T_{soll,L/P}$=67.5° C. (approximately) is located for instance in the temperature range $T_{opt}$. For regulating the cooling system, a temperature difference $\Delta T_{BZ,lim}$ between the coolant inlet and coolant outlet is specified. In currently conventional fuel cells 1, this temperature difference is for instance in the temperature range of from 5 to 10K. After a change in the electrical consumer load 10 as an input variable into the fuel cell 1, the calculation of $K_\eta$ is done as shown above. As already briefly explained, in the case where $K_\eta$>0, an increase in the fuel cell waste heat $Q_{ab}$ from an electrical consumer load increase 10 is carried away by increasing the volumetric coolant flow 6 and thus the pump rpm and the pump power $P_P$. Conversely, if $K_\eta$<0, the heat dissipation $Q_{ab}$ is effected via an increase in the cooling airflow 5, by raising the fan rpm or the fan power $P_L$.

As a criterion for the decision of the amount by which the pump or fan rpm is to be varied, an inquiry as to the instantaneous temperature difference $\Delta T_{BZ}$ as in FIG. 5 is advantageously made via the temperature sensor system.

Based on the knowledge of the volumetric coolant flow $V_W$ and the waste heat $Q_{BZ}$ as well as the following relationship:

$$\Delta T_{BZ}=Q_{BZ}/(cw*pw*Vw)$$

the temperature sensor system according to the invention makes use of the capability of realizing the temperature difference $\Delta T_{BZ}$ by detecting the outlet temperature $T_{W,BZ}$ by means of the temperature sensor 7. In this operation, $c_W$ stands for the thermal capacity, and $p_W$ stands for the density of water.

The volumetric coolant flow 6 ($V_W$) is advantageously ascertained by measuring the pump feeding power $P_P$ and the pump clamp voltage $U_P$ at given system pressure losses. The system pressure losses are adjusted with the aid of a throttle valve, not identified by reference numeral. Moreover, in brushless electric pump drives, the rpm information for correlating the pump rpm with the volumetric coolant flow 6 for a given system pressure loss is available.

In general, the goal of the temperature regulation according to the invention is to set the predetermined allowable temperature difference $\Delta T_{BZ,lim}$ and the optimal fuel cell temperature $T_{opt}$ as in FIG. 2. This means that the pump power $P_P$ and the fan power $P_L$ are regulated as needed in such a way that the sum of the two as much as possible is equivalent to a minimum of the electrical consumption required for the cooling.

If $\Delta T_{BZ,lim}$ or the fuel cell temperature $T_{opt}$ is exceeded, the pump rpm and/or the fan rpm is raised in defined increments. The definition of the incremental rpm increase is done by simulation or measurement of the fuel cell system in operation.

Figure 6:
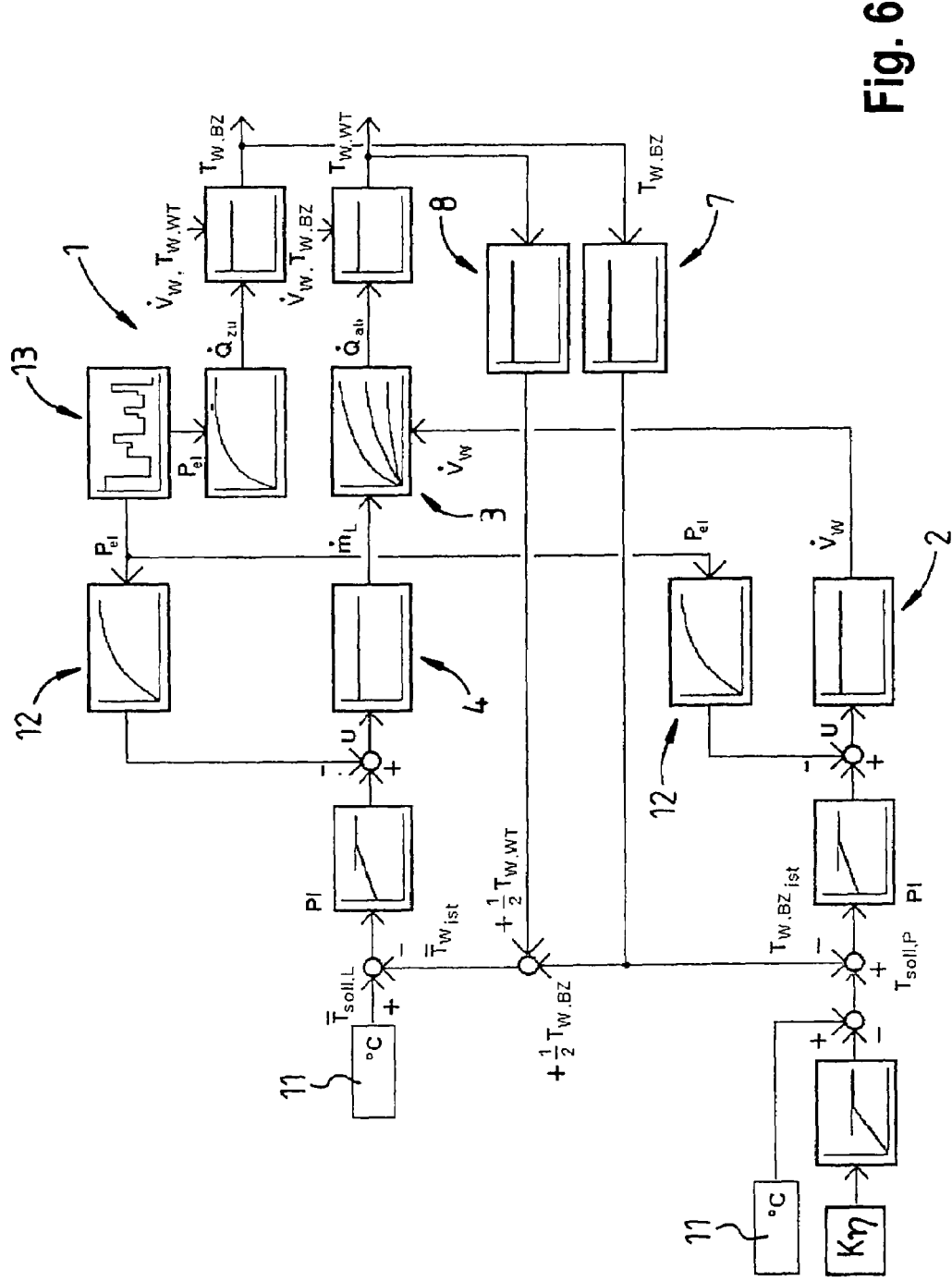
FIG. 6 is a schematic block circuit diagram of a fuel cell system according to the invention.

The adjustment of the pump or fan rpm is done by way of a set-point value specification $T_{soll,P}$ or $T_{soll,L}$, as shown in FIG. 6. The set-point value specification $T_{soll,P}$ is made, taking into account a maximum allowable pump and fan rpm. The separate set-point value specification for the fan 4 and pump 2 makes the independent setting of the fuel cell temperature $T_{opt}$ possible, for regulation given a variable specification of the temperature difference $\Delta T_{BZ}$.

Moreover, a so-called interference variable imposition 12 is provided, which enables a fast reaction of the temperature regulation to an altered heat loss $Q_{ab}$ of the fuel cell 1. As a result, as constant as possible a fuel cell temperature $T_{opt}$ is attainable. For ascertaining the characteristic values for an interference variable imposition 12, it is necessary to know the section behavior of the fuel cell stack 1 under varying operating conditions, and especially with varying heat losses Q resulting from load changes or the like.

Ascertaining the section behavior can be done comparatively simply, for instance for a fuel cell 1 that is used for operating a so-called auxiliary power unit, since the operating points of the fuel cell are for the most part defined before the fuel cell system is put into operation. Moreover, the APU among others has load profiles 13 with large stationary parts, which are favorable for the type of regulation shown here.

For using the fuel cell 1 for propulsion systems, a mean fuel cell heat loss $Q_{ab}$ specific to a driving cycle can optionally be assumed that corresponds to a quasi-stationary operating state to which the cooling system is regulated. Experiments accordingly may be done, for instance during development of the fuel cell system, parallel to defining the operating strategy for the fuel cell system.

In general, regulating the coolant loop temperature of a fuel cell system essentially has the function of regulating an optimal operating temperature $T_{opt}$ for the power output of the fuel cell 1 under varying electrical consumer loads 10, 13. The optimal operating temperature $T_{opt}$ of the fuel cell 1 can in general be considered virtually equivalent to the outlet temperature of an oxidant and is within a defined temperature range, which is dependent on the fuel cell 1 used. The coolant loop of the fuel cell 1 essentially includes the component sensor system, the fuel cell 1, the regulatable pump 2 and regulatable fan 4, temperature sensors 7, 8, the heat exchanger 3 (WT) and the hoses or tubing. For carrying out the temperature regulation, the following data in particular are advantageous:

Heat balance of the fuel cell
Heat exchanger performance graph
Characteristic system curve, coolant side
Characteristic system curve, cooling air side
Characteristic pump curve
Characteristic fan curve The relevant data are generally already available at the beginning or in the course of a fuel cell system development, in the form of performance graphs or outcomes of measurement or situations. In detail, these are as follows:

Heat balance of the fuel cell
From performance graph measurement of the relevant operating points;
Heat exchanger performance graph
Power measurement (heat loss by varying the coolant and cooling air flows) and measurement of the pressure losses on the coolant and cooling air sides;
Characteristic system curve, coolant side
Pressure losses from pressure measurement upstream and downstream of the water pump, or individual pressure losses from fuel cell stack, valves, hoses, and heat exchanger;
Characteristic system curve, cooling air side
Pressure losses in the cooling air path are determined essentially by the heat exchanger and are available in the form of the heat exchanger performance graph data. If pressure losses caused by heat exchanger integration in the vehicle are significant, they can be ascertained from measurements or 3-D flow simulations of the cooling air path. The cooling air path is defined as the section upstream of the entry of the cooling air into an air duct to the air outlet flow downstream of the heat exchanger;
Characteristic pump and fan curve
Measurement data of the characteristic component curve are generally available from the component manufacturer.

In general, the temperature regulation according to the invention has the following advantages over the prior art:

Identification and triggering of the most-efficient cooling system components, for heat dissipation at the application operating point of the fuel cell, with the aid of a gradient observation of the heat exchanger performance graph;

Regulating the fuel cell temperature, at minimal demand-appropriate consumer power of the pump and fan of the coolant loop;

Rapid tracking of the coolant temperature in the event of a variable fuel cell heat input by means of an interference variable imposition;

Variable setting of a coolant temperature difference via the fuel cell for controlling the nonhomogeneous temperature distribution in the fuel cell stack;

Elimination of one temperature sensor by means of knowledge of the fuel cell heat loss, particularly from heat balance measurements, and of the volumetric coolant flow, particularly from tests or simulation.

It will be understood that each of the elements described above, or two or more together, may also find a useful application in other types of constructions differing from the types described above.

While the invention has been illustrated and described as embodied in a fuel cell system with a cooling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for operating a fuel cell system, comprising the following steps:

providing a fuel cell unit for generating electric current and/or thermal heat;

providing a cooling device for cooling said fuel cell unit, said cooling device having a heat exchanger unit, at least one first flow generator and at least one second flow generator;

providing a control unit;

generating a first flow of a first cooling water fluid by the at least one first flow generator, the first flow circulating the first cooling fluid through the fuel cell unit and the heat exchanger unit;

generating a second flow of a second cooling air fluid by the at least one second flow generator, the second flow flowing the second cooling fluid through the heat exchanger unit;

performing by the control unit a parameter comparison to obtain a comparison result, wherein the parameter comparison comprises comparing changes in a volume flow of the first flow and in power of the at least one second flow generator with predetermined operating parameters of the at least one first and second flow generators;

regulating, according to the comparison result, at least one of the at least one first flow generator and the at least one second flow generator.

2. The method as defined in claim 1, wherein by means of the control unit for performing the parameter comparison, a power coefficient ($K_\eta$) is formed according to the following equation:

$$K_\eta = \left(\frac{dQ_{ab,P}}{dV_W} * \frac{dV_W}{dP_P}\right) - \left(\frac{dQ_{ab,L}}{dm_L} * \frac{dm_L}{dP_L}\right)$$

wherein $dQ_{ab,P}$ represents a differential change of heat dissipation generated by the at least one first flow generator; $dV_W$ represents a differential change of the volume flow of the first cooling fluid; $dP_P$ represents a differential change of the power of the at least one first flow generator; $dQ_{ab,L}$ presents a differential change of the heat dissipation generated by means of the at least one second generator; $dm_L$ represents a differential change of the mass flow of the second cooling fluid; and $dP_L$ represents a differential change of the power of the at least one second flow generator.

3. The method as defined in claim 2, wherein by means of the control unit, an increase of rpm or power of the at least one first flow generator takes place, when $K_\eta>0$.

4. The method as defined in claim 2, wherein by means of the control unit, an increase of rpm or power of the second flow generator takes place, when $K_\eta>0$.

5. The method as defined in claim 1, wherein the comparison is performed by means of the control unit when a fuel cell temperature leaves a predetermined temperature range.

6. The method as defined in claim 1, wherein by means of the control unit, a comparison of at least two temperatures of the fuel cell unit and/or the cooling device takes place.

7. The method as defined in claim 6, wherein by means of the control unit, a change of at least the power and/or the rpm of the at least one first flow generator and/or the power and/or the rpm of the at least one second flow generator occurs as a function of the temperature comparison.

8. The method as defined in claim 1, wherein the heat exchanger unit exchanges heat between the first and second cooling fluids.

9. The method as defined in claim 8, wherein at least one performance graph of the heat exchanger unit is stored in the control unit.

10. The method of claim 9, wherein the performance graph of the heat exchanger unit is formed as a function of an operating parameter of the at least one first and second flow generators.

* * * * *